United States Patent [19]
Klebba

[11] 3,851,905
[45] Dec. 3, 1974

[54] LATCHING MECHANISM FOR SLIDING DOORS IN A MOTOR VEHICLE

[75] Inventor: Horst Klebba, Weyhausen, Germany

[73] Assignee: Volkswagenwerk AG, Wolfsburg, Germany

[22] Filed: Dec. 26, 1973

[21] Appl. No.: 427,570

[30] Foreign Application Priority Data
Dec. 27, 1973 Germany............................ 2263421

[52] U.S. Cl........................... 292/11, 49/450, 70/99, 70/146, 292/45, 292/207
[51] Int. Cl............................................. E05c 9/00
[58] Field of Search............. 292/5, 11, 45, 47, 100, 292/207, 216, DIG. 23, DIG. 24; 70/99, 146; 49/213, 278, 449, 450

[56] References Cited
UNITED STATES PATENTS

| | | | |
|---|---|---|---|
| 2,922,672 | 1/1960 | Van Voorhees...................... | 292/11 |
| 3,204,999 | 9/1965 | Schwenk............................... | 49/213 |
| 3,206,239 | 9/1965 | Wang................................... | 292/198 |
| 3,374,018 | 3/1968 | Lust..................................... | 292/45 |
| 3,670,536 | 6/1972 | Klebba.................................. | 70/99 |

Primary Examiner—Robert L. Wolfe
Attorney, Agent, or Firm—Ernest F. Marmorek

[57] ABSTRACT

A latching mechanism for a sliding door, especially for motor vehicles, including a first latching device mounted on the door at one side thereof, a locking bolt on a doorframe cooperating with the first latching member when the first latching member is actuated and the door is in its closed position, a second latching member mounted at the other end of the door opposite to the first latching member and being remotely operable to a latching position by the first latching member, a locking bolt mounted on the doorframe adjacent the second latching member and cooperating with the second latching member when the door is in its closed position, a force transmitting arrangement coupling the first and second latching members including a safety lever for latching the second latching member in a safe position when the door is closed, the first latching member including a swivel latch plate having a latching portion cooperating with the associated locking bolt when the door is in closed position and mounted for pivotable movement for engaging the locking bolt in the closed position of the door, the swivel plate includes a camming portion and a main ratchet portion, a pawl pivotably mounted on the door and secured to the force transmitting arrangement and adapted for riding over the camming surface during the release position of the door and entering into the main ratchet during the latched position of the door, the force transmitting arrangement coupling the pawl operably with the safety lever and forcing the safety lever into a latched position with the first latching member when the pawl is in the main ratchet, the movement of the pawl into the main ratchet being in synchronism with the entry of the safety lever into the latched position with the first latching member.

6 Claims, 2 Drawing Figures

PATENTED DEC 3 1974

3,851,905

LATCHING MECHANISM FOR SLIDING DOORS IN A MOTOR VEHICLE

FIELD OF THE INVENTION

The present invention relates to the locking arrangement for a sliding door, particularly for motor vehicles having a central locking member placed in a back region of the door with respect to the sliding movement of the door and a remote locking member placed in a front region of the door with respect to the sliding movement of the door. The locking arrangement further includes a latch member which engages a locking bolt placed on the door frame, when the door is closed, and a safety lever means which becomes latched in the closed position and which moves into its latched position by means of a spring and, further including force transmitting means for coupling the safety lever to the central locking member.

BACKGROUND OF THE INVENTION

The above described locking arrangement became known from German laid-open application No. 2,014,272,63c,71. In this known locking arrangement the operation of the central locking member is performed over the force transmitting means by the remote locking member which fact requires a relatively complicated arrangement in the region of the remote locking member.

A sliding door arrangement for motor vehicles which, when closed, is flush with the wall of the vehicle became known from U.S. Pat. No. 3,204,999 issued Sept. 7, 1965 to Kurt Schwenk and assigned to the same assignee as the present application. The full content of such U.S. patent is hereby incorporated by reference.

SUMMARY OF THE INVENTION

It is, therefore, an object of the present invention to provide a locking arrangement for a motor vehicle having sliding doors which is simple in its structure and which enables that the spring means during the closing movement of the door will be pulled along with the door.

According to the present invention the main or central lock member includes a swivel plate cooperating with the locking bolt mounted on the door frame and which plate is pivotably mounted about an axle vertically arranged on the door at the region thereof adjacent the door frame, the swivel plate including a running surface and a main ratchet portion, the latter serving for engagement by a pawl which is coupled with a safety lever means through a force transmitting means, a spring means forcing the safety lever against the swivel plate and over the force transmitting means into a latched position synchronously with the running of the pawl into the ratchet means of the swivel plate.

In a sliding door arrangement which is mounted for opening and closing by being moved in the horizontal direction, the latching arrangement according to the present invention finds application and employs fork-like latch means which cooperates with a locking bolt in a conventional manner so that when the door is moved from its open position into the closed position the locking bolt will cause a pivoting of the fork-like latch means. Such pivoting movement according to the present invention will result in that when the pawl runs into the main ratchet of the swivel plate the force transmitting means will transfer such movement of the pawl onto the safety lever so that it will synchronously with the entry of the pawl into the main ratchet, enter into its latching position. In contrast to known locking arrangements for sliding doors, the safe latching of both locking members, namely the main or central locking member and the remotely locking member of the entire locking arrangement is initiated from the swivel plate of the central or main locking member.

For reasons of space saving a latching wheel is included into the swivel plate but it can be separately made, but the essential function of it remains namely that it will carry a main ratchet portion at the region thereof which in closed position of the door lies opposite to the locking bolt.

According to the preferred embodiment of the present invention the force transmitting means includes a rod means extending between the pawl and one end of a two-armed lever of the remotely operated locking member, to the other end of such two-armed lever, the safety lever being coupled. As a result, the oppositely directed movement of the pawl and of the safety lever is attained which is required in order to set the door on safe latch. It is noted that it is within the scope of the present invention that the force transmitting means can be replaced by cables or Bowden arrangements requiring only to assign different connecting points on the pawl as well as on the two-armed lever.

According to another aspect of the present invention the rod means passes through an abutting means provided on the door and has provided thereon a coil spring which is compressed between the abutting surface and the pawl.

Although the release of both central and remotely operable locking members is performed by the swivel plate latch included in the central locking member, there is however provided at least one actuating handle secured to the pivot axle of the two-armed lever of the remotely operated locking member with which the releasing of the door can be performed.

By employing a rod as the force transmitting means which can reliably undergo a compression or tension load, it will reliably transmit the releasing movement from the remotely operable locking member onto the pawl, then this, unto the central locking member, consequently.

By appropriate measures according to the present invention the spring means which during the releasing of the locking arrangement becomes tensioned, can be included into aiding the closing movement of the door during the last phase of the closing movement. For this purpose the running surface of the swivel plate latch is provided with a region adjacent the main ratchet portion thereof, the tapering nature of which is such that the distance of its surface from the pivoting axle of the plate becomes smaller as the surface approaches closer to the main ratchet portion of the plate. As a result, the spring means through the pawl which when the central locking member is in its released position will abut against the running surface of the swivel plate, will exert a momentum onto the swivel plate or on its associated latching wheel, so that the swivel plate will tend to pivot into its latched position. Inasmuch as the swivel plate latch with its inner or oppositely lying latch portion abuts against the locking bolt, this will further contribute to the aiding of the closing movement of the door.

BRIEF DESCRIPTION OF THE DRAWING

The present invention will become more readily apparent from the following description of a preferred embodiment thereof shown, by way of example, in the accompanying drawing, in which.

DESCRIPTION OF THE PREFERRED EMBODIMENT

Figures 1, 2:
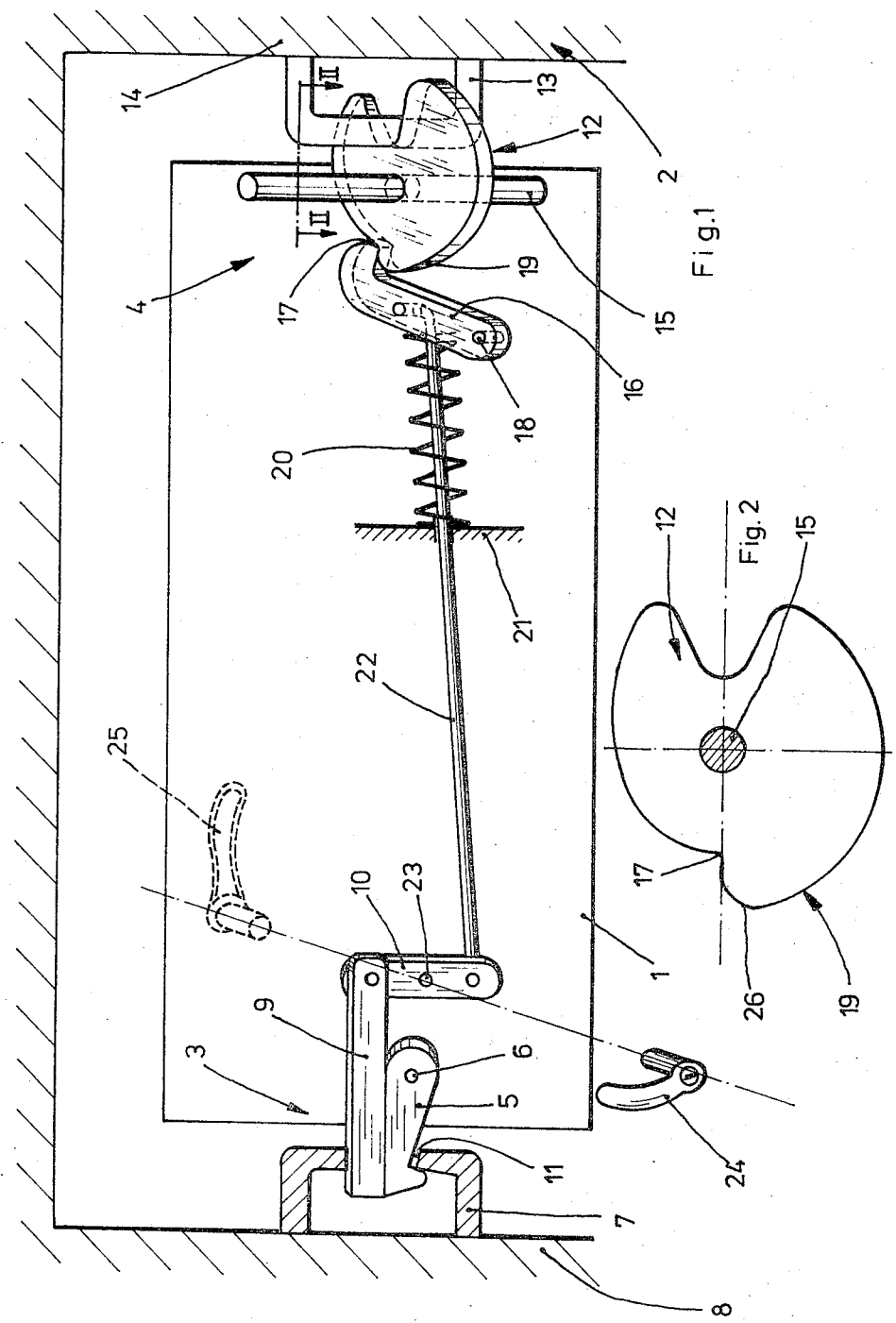
FIG. 1 is a schematic illustration of a side sliding door of a wagon-type motor vehicle together with its locking arrangement in a perspective view from the inside of the vehicle.
FIG. 2 is an illustration of the parts viewed in the direction of the arrow II—II in FIG. 1.

With reference to FIG. 1 it is noted that the eventual sliding door 1 is obviously provided with an outer surface, such as shown in the above mentioned U.S. patent, which will cover the gap existing between the door frame 2 and the sliding door 1 as illustrated schematically. Such gap has been illustrated as being somewhat out of proportion in order to be able to more clearly show the locking arrangement on both sides of the sliding door 1.

The locking arrangement substantially includes the remote locking member 3 and a central locking member 4. Considering first the remote locking member 3 it is seen from the drawing that it includes as its components the latching bolt 5 which is fixed to the door 1 in a manner so that it can pivot about the axle 6. As can be seen also in FIG. 1 such locking or latching bolt 5 at its left end is shaped as a hook so that in the closing or locking position it could latch itself onto the closure U-bolt 7 which is mounted in the front region 8 of the door frame 2 when viewed in the direction of the sliding door 1. It is noted that when in the forthcoming description of the present invention the phrase "front" or "back" is mentioned, one should understand such phrases as referring to regions which lie at locations referenced to the direction of the movement of the sliding door 1 when it is being moved to its closed position.

Considering now the construction of the remote locking member 3, it is noted that it includes further a safety lever 9 which in the present illustrated embodiment can be shifted in the horizontal direction by means of the two-armed lever 10. In the illustrated latched position of the remote lock member 3 (which becomes automatically the same position of the central lock member 4) the safety lever 9 protrudes also into the aperture 11 provided in closure plate 7 for the entry of the locking bolt 5 so that it will latch the locking bolt 5 safely in such opening as can be seen from the illustrated latched position of FIG. 1, since the opening 11 is only wide enough to enable the locking bolt 5 to exit from it if the safety lever 9 has already been withdrawn.

An essential component of the central locking member 4 is the swivel latch 12 which with its fork-like region surrounds the locking bolt 13 fixedly mounted on the region 14 of the door frame 2 which is adjacent to the lock member 4. The swivel latch 12 is pivotably mounted about a pivot axle 15 which in the present illustrating embodiment is shown to be a vertical axle. The pivot axle 15 itself is also secured to the door 1. The swivel latch 12 at the region thereof which is facing the locking bolt 13 is shaped in such a manner that it forms a latching wheel cooperating with a pawl 16. The swivel latch 12 includes for such purpose a main ratchet portion 17 which will engage with the pawl 16 when the locking members 3 and 4 are in the illustrated safety position of FIG. 1 so that an opening of the door under these conditions is reliably prevented. The pawl 16 is pivotably mounted upon a pivot axle 18 which is also vertically arranged in the illustrative embodiment of FIG. 1. The pivot axle 18 is also mounted on the door 1.

The swivel latch 12 at its portion which is located opposite to the locking bolt 13 has a sliding surface 19 onto which the pawl 16 securely abuts when the door is released from its safety position under the pressure of a compression spring 20. The compression spring 20 abuts against the supporting surface 21 on the door 1 and is arranged about the rod 22 which, with its right side end as seen in FIG. 1, is secured to the pawl 16 at the portion thereof located between the hook-like end and the pivoting axle 18 thereof, while the rod 22 with its left end, as seen in FIG. 1, is secured to the end of the two-armed lever 10 which is further away from the point of engagement of the safety lever 9. By means of the rod 22 a synchronized operation between the locks 3 and 4 is attained in the case when the door actuating handles 24 and 25 fixedly secured to the pivoting axle 23 of the lever 10 are actuated in order to release both locks 3 and 4. A similar synchronized operation will take place when the door 1 is closed and the swivel latch 12 plate 12 becomes rotated and the pawl 16 will run into the main ratchet 17.

Considering now the illustration of FIG. 2 which shows the swivel plate 12 in plane view, it is seen that it has a sliding surface 19 which is provided with the rounded-off portion 26 in the immediate vicinity of the main ratchet portion 17 into which the pawl 16 is engaged in the safety position of the door, while the pawl 16 will rest against the sliding surface 19 during the released position of the door 1. The rounding of the portion 26 is such that it has a decreasing diameter from the pivot axle 15 of the swivel plate 12 with decreasing distance from the main ratchet 17. Whenever the pawl 16 will lie or abut against such portion 26, the spring 20 will exert a momentum onto the swivel plate 12 by means for the pawl 16 so that the swivel plate 12 will tend to pivot counter clockwise into its closing position. In the case of an easily sliding door 1, it is sufficient for closing it to bring it into its opening in the frame 2 and slightly press it transversely into its opening as described in the above mentioned U.S. patent and, only to an extent, that the portion 26 of the sliding surface 19 is pivoted into engagement with the hook-like portion of the pawl 16. The remaining closing movement of the door 1 including the safety positioning or latching of both locks 3 and 4 will be then performed by the appropriately strong compression spring 20, as above described, due to the tapering nature of the portion 26.

I wish it to be understood that I do not desire to be limited to the exact details of construction shown and described, for obvious modifications will occur to a person skilled in the art.

Having thus described the invention, what I claim as new and desire to be secured by Letter Patent, is as follows:

1. A latching mechanism for a sliding door preferably for motor vehicles comprising a first latching means mounted on the door at one end region thereof, locking bolt means on a doorframe cooperating with said first latching member when said first latching member is actuated and the door is in its closed position, a second latching member mounted at the other end of the door opposite to said first latching member, a locking bolt means mounted on the doorframe adjacent said second latching member and cooperating with said second latching member when said door is in its closed position, a safety lever adapted to be forced in a position securing said second latching member in a latching position when the door is in its closed position, means for coupling said first latching member and said safety lever in a safe position when said door is closed, said first latching member including a swivel latch plate means comprising a latching portion cooperating with said locking bolt when said door is in closed position and mounted for pivotable movement for engaging said locking bolt means in the closed position of said door, said swivel plate means including a camming portion and a main ratchet portion, said first latching member further including a pawl means pivotably mounted on said door and secured to said coupling means and adapted for riding over said camming portion during the release position of said door and entering into said main ratchet portion during the latched position of said door, spring means holding said pawl means in contact with said camming and said main ratchet portion, said coupling means coupling said pawl operably with said safety lever and forcing said safety lever into a latched position with said first latching member when said pawl is in said main ratchet, the movement of said pawl into said main ratchet being in synchronism with the entry of said safety lever means into said latched position with said first latching member.

2. The latching mechanism as claimed in claim 1, wherein said swivel plate latch means being mounted on an axle mounted on said door parallel with an adjacent region of said doorframe and wherein said main ratchet portion of said swivel plate latch means is lying opposite to the associated locking bolt means on said door frame, wherein said swivel plate latch means including a recessed portion forming a pair of leg portions in said swivel plate latch means for cooperating with said associated locking bolt means and abutting against said locking bolt means when said door is in the latched position.

3. The latching arrangement as claimed in claim 1, wherein said coupling means between said first and second latching members comprises a rod means with one of its ends coupled to said pawl, said remotely operable latching member including a two-armed lever means coupled at one end thereof to said safety lever means and at the other end thereof coupled to said rod means.

4. The latching arrangement as claimed in claim 3 wherein an actuating handle means is coupled to the pivoting axle of said two-armed lever means for releasing said door from said safety position.

5. The latching arrangement as claimed in claim 3, wherein said rod means is passing through an abutting surface in said door, a coil spring means mounted above said rod means and said spring means at one end thereof abutting against said abutting surface and at the other end thereof abutting against said pawl means.

6. A latching arrangement as claimed in claim 1 wherein said swivel plate latch means comprises a region included in said camming surface thereof adjacent said ratchet portion, said region having a curvature the distance of which decreases with respect to the pivoting axle of said swivel latch means with decreasing distance from said main ratchet means.

* * * * *